United States Patent Office 2,860,423
Patented Nov. 18, 1958

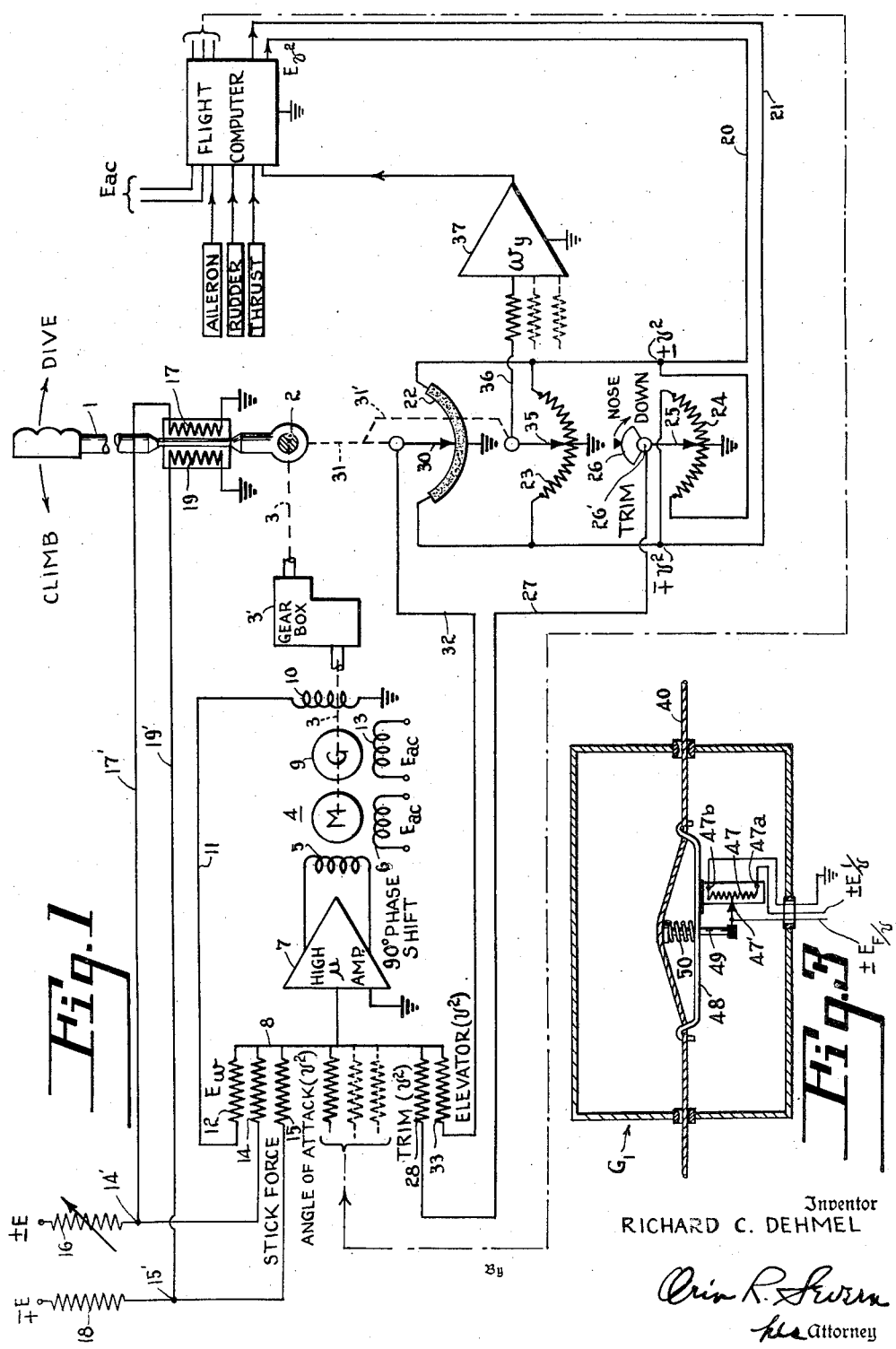

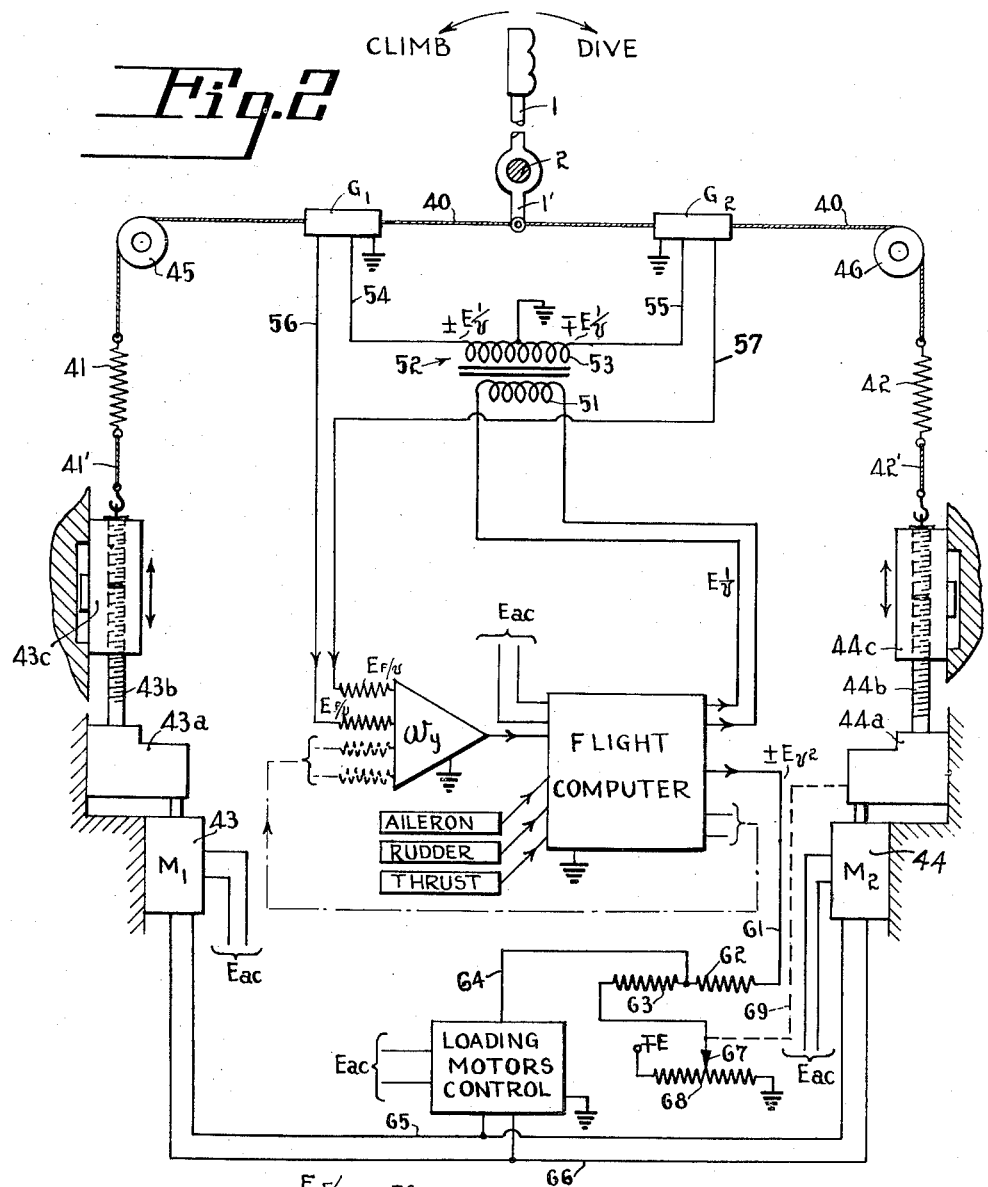
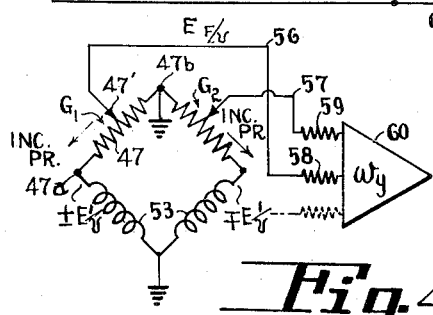

2,860,423

FLIGHT TRAINING APPARATUS FOR SIMULATING CONTROL LOADING WITH PILOT PRESSURE CONTROL

Richard C. Dehmel, Short Hills, N. J.

Continuation of application Serial No. 229,794, June 4, 1951. This application October 15, 1954, Serial No. 462,488

13 Claims. (Cl. 35—12)

This invention relates to simulated control loading for ground based flight training apparatus of the character having simulated aircraft controls operable by a student pilot for representing flight conditions.

This application is a continuation of my application S. N. 229,794 filed June 4, 1951 (now abandoned).

In actual flight, an aircraft is caused to rotate angularly about its axes, generally designated the X, Y and Z axes, according to the turning moments produced about these axes by deflection of the aileron, elevator and rudder controls respectively. Heretofore it has been the general practice where control loading is simulated in flight training apparatus to operate a potentiometer, for example, from each control according to the displacement of that control from a nominal neutral position. The potentiometer or equivalent means for deriving a control quantity is energized by a voltage or control quantity that varies according to an appropriate function of airspeed. Accordingly, the potential derived from the potentiometer coincident with control deflection is a measure of and corresponds to the turning moment produced according to the control displacement from the established neutral position.

However, in practice, pilots fly aircraft not wholly according to control displacement but by pressure on the controls. Hence, the pilot judges the fidelity of the simulation of the trainer by the reaction of the simulated flight instruments to control pressure as he displaces the control. For this reason, improved fidelity of simulation can be more readily obtained by producing a control quantity representing the aforesaid turning moment by control pressure responsive means instead of wholly by control displacement responsive means.

This arrangement has the further advantage that the pressure-deflection-airspeed characteristics of the control loading system need not be as accurately reproduced in the simulating apparatus when using a pressure actuated potentiometer, for example, as when using displacement actuation. This is due to the fact that the moment voltage derived is a pressure function of the control, considering the case of actual aircraft, whereas if related in the simulator to control displacement, the simulation of the relationship between the control displacement and pressure at every synthetic or simulated airspeed must be very accurate. Accordingly, a further advantage is apparent in that simpler and more economical simulating equipment can be used because the pressure-displacement curves for any given airspeed need not be met as accurately in training apparatus wherein the moment voltages are derived from pressure responsive means.

A principal object of this invention therefore is to provide more faithful simulation of the "feel" of aircraft controls in actual flight by deriving control quantities representing control moments according to pilot pressure applied to the respective control.

Another object of the present invention is to provide a representation of turning moment which is not affected by friction in the simulating equipment which otherwise might cause error due to sticking of the control in a displaced position; whereas in such a case a pressure responsive representation of turning moment would not be affected by the control position as such.

The invention will be more fully set forth in the following description referring to the accompanying drawings, and the features of novelty will be pointed out with particularity in the claims annexed to and forming a part of this specification.

Referring to the drawings,

Fig. 1 is a partly diagrammatic and schematic illustration of a control loading system embodying the present invention using strain gages as pressure responsive means in combination with a torque type loading motor;

Fig. 2 illustrates a modified form of the invention using pressure responsive means in combination with loading springs;

Fig. 3 is a detail view illustrating a strain gage element of a type that may be used in Fig. 2, and Fig. 4 is a diagrammatic illustration of the strain gage circuits indicated in Figs. 2 and 3.

The control loading system of Fig. 1 is illustrated in connection with a single control, namely, the elevator or stick control; and, since the control equipment is essentially similar for the aileron and rudder controls such additional disclosure is repetitious and is believed to be unnecessary for a complete understanding of the invention. The application of the present control loading system to the simulated aileron and rudder controls will be obvious from the present description taken in connection with the drawings.

The elevator control represented as the stick 1 is pivotally mounted on a shaft 2 for fore and aft movement representing dive and climb elevator attitudes, respectively. The shaft 2 is suitably mechanically connected as indicated at 3 to a torque loading motor 4 through reduction gearing indicated at 3'. The torque motor 4 is energized in a manner hereinafter described so as to oppose in a realistic manner pilot pressure applied to the stick 1. To this end the torque motor 4, which is of the two-phase type having a control winding 5 and a winding 6 energized by a reference alternating current voltage $E_{ac}$ is controlled according to the resultant of a plurality of voltages presently described representing various forces acting on the elevator control. These voltages are fed to a conventional force summing amplifier 7 as indicated which also dephases by 90 degrees the output voltage for the control winding 5 for conventional two-phase operation of the motor 4. The amplifier 7 has also sufficiently high gain considerably to overtorque, without hunting, the motor 4 for small increments of voltage input for the purpose of ensuring correct stick pressure at a certain displacement as hereinafter explained.

The voltage inputs for the amplifier 7 represent various forces acting on the elevator control, including the force exerted by the pilot and the reaction forces due to airspeed, the amount of control deflection, and various other factors such as angle of attack, trim, etc. The main reaction force is due to airspeed and this force increases as the square of airspeed ($v^2$). Specifically, the input voltages are shown as connected to a main bus conductor 8 that is in turn connected to the input stage of the amplifier as indicated whereby the input voltages are algebraically summed and the resultant voltage is amplified and dephased 90° for controlling the torque loading motor 4.

Considering the input voltages in the order illustrated, a velocity feedback voltage $E\omega$ is produced in the winding 10 of the feedback generator 9 which is connected by conductor 11 to the input proportioning resistance 12 that in turn is connected to the bus conductor. The feedback generator 9 is of the well-known two-phase type having in addition to the generating winding 10 a winding 13 energized by a source of reference alternating current voltage $E_{ac}$, and is mechanically connected to the motor 4 as indicated. The velocity feedback voltage $E\omega$ serves to assure a more linear relationship between the motor speed and its input voltage and to prevent overshooting and hunting.

The stick force exerted by the pilot is represented by the resultant of two voltages appearing at the input proportioning resistances 14 and 15, respectively. These resistances are connected to respective sources of A. C. voltage dephased 180° from each other so that normally in the absence of other factors, the resultant of the equal and oppositely phased voltages is zero. For the purpose of varying the resultant voltage according to the pilot stick force, voltage dividing means may be used comprising in the present instance fixed and variable resistances, the latter being in the form of strain gage resistances for example, responsive to forces applied to the stick. Specifically, the input resistance 14 is connected to a junction 14' of one voltage divider comprising an adjustable resistance 16 energized from the source $\pm E$ and a strain gage resistance 17 suitably connected to the stick 1; and the input resistance 15 is connected to a junction 15' of the other voltage divider comprising a fixed resistance 18 energized from the source $\mp E$ and a strain gage resistance 19 also suitably connected to the stick 1. The strain gage resistances 17 and 19 per se are not part of the present invention and may be of any suitable and well-known type for measuring stress in bodies subject to slight deflection or deformation, such as those used for checking the static wing loading of airplanes. The strain gages are suitably bonded to opposite sides of a reduced portion of the stick, for example, so that for a given stick force tending to flex slightly the stick 1 in one direction or the other, one gage is affected by tension while the other gage is affected by compression so as to increase and decrease respectively the gage resistances as well known in the art. At the same stress, the resistances 17 and 19 are equal. The divider resistance 16 is made adjustable solely for purposes of calibration.

Accordingly, it will be seen that the voltages at the divider junctions 14' and 15' can be varied both as to magnitude and sense by applying force to the stick 1, as for example, in the case of a simulated climb maneuver where the stick force tending to rotate the stick counter-clockwise as viewed causes the resistance 17 to be increased and the resistance 19 to be decreased. In such a case the potential at junction 14' is increased and the potential at junction 15' is decreased so that the resultant potential has the phase of the source $\pm E$. In the case of a simulated dive maneuver, the resultant voltage is of opposite phase since the potential at junction 15' now predominates by reason of the reversal of the relative values of the gage resistances. Thus, the torque loading motor 4 tends to be operated in one direction in the case of a climb maneuver to resist movement of the stick from neutral and in the opposite direction in the case of a dive maneuver also to resist movement of the stick.

Other inputs at the force summing amplifier 7 may include representations of flight factors as related to airspeed such as angle of attack, rate of pitch, thrust, etc. These factors may be determined by a simulated flight computer and used in the invention where greater precision of simulation is desired. The present arrangement however is reasonably realistic and is sufficiently complete to teach the invention. The simulated flight computer per se forms no part of the present invention, one such computer that may be used in practicing the present invention being described and claimed in my co-pending application, S. N. 429,314 filed May 12, 1954, that is a continuation of Serial No. 777,414, filed October 2, 1947 (now abandoned) for "Flight Computing System and Apparatus." Such a computer is controlled by input voltages derived from operation of the simulated aircraft controls as indicated for producing voltages representing various flight factors such as functions of airspeed, angle of attack, rate of pitch, and other flight conditions. Specifically, a function of airspeed, namely, air speed squared ($v^2$) is represented by a voltage $E_v^2$ produced by the computer. This voltage is used to energize the stick controlled potentiometers 22 and 23 and the trim potentiometer 24 that are connected to the computer by conductors 20 and 21.

The amplifier input voltage representing trim adjustment is derived from the trim potentiometer 24 by adjusting the slider contact 25 according to the trim desired. For this purpose the slider is connected to a manual control 26 that is angularly adjustable by the pilot about the pivot 26' as in conventional practice. The slider contact is connected by conductor 27 to the amplifier input resistance 28, and the phase of the derived voltage is such that the motor 4 tends to move the stick to a new neutral position, depending on whether the "nose" of the aircraft is to be raised or lowered. For example, in the circuit shown, the assumed instant polarity of the trim voltage is negative when the nose is to be raised thus energizing the motor 4 in a direction tending to rotate the stick counter clockwise, as viewed, toward a climb position. This is consistent with the polarity of the stick force voltage, the resultant of which has an instant polarity tending to restore (rotate clockwise) the stick to neutral when the pilot pulls the stick back for a climb maneuver. Conversely, in the case of trimming for bringing the nose down, the instant polarity of the derived trim voltage is now positive, thus causing the motor 4 to move the stick clockwise away from neutral toward a dive or nose-down trim position.

The trimmed position of the stick is arrived at and stabilized by means of the derived "answer" voltage from the stick displacement potentiometer 22 which is controlled according to stick displacement or position. This potentiometer, it will be noted, is energized by the voltage $E_v^2$ so that its terminals are oppositely phased with respect to the corresponding trim potentiometer terminals. The resistance element of the potentiometer 22 is preferably composed of carbon or equivalent resistance material so that minute adjustments of the slider contact 30 produce corresponding changes in the derived voltage thereby assuring a uniform "feel" at the stick in contrast to incremental torque reactions from the motor caused by step function voltages as derived from wire wound potentiometers. The slider 30 which is suitably mechanically connected as indicated at 31 to the stick 1, is electrically connected by conductor 32 to the amplifier input resistance 33. Accordingly, it will be noted that in a climb maneuver, for example, the instant polarity of the derived voltage representing elevator displacement is positive, thereby tending to "answer" the trim voltage. Thus, the motor 4, in the case of trim adjustment, seeks a trim position that is satisfied when the derived voltage from potentiometer 22 equals that from trim potentiometer 24.

In the case of a climb or dive maneuver, the derived voltage from the displacement potentiometer 22 adds to that of the stick force for resisting movement of the stick from its neutral position, thereby simulating control loading according to joint effects of control displacement and control pressure.

The stick 1 also controls through the connection indicated at 31', the main elevator control potentiometer 23, from which the voltage derived at slider contact 35 is fed by conductor 36 to the rate of pitch ($\omega_y$) amplifier 37 constituting a part of the flight computer system above referred to. The rate of pitch amplifier energizes a servo system (not shown) that is interconnected to other servo systems of the flight computer in the manner disclosed in my aforesaid application, Serial No. 429,314.

As previously explained, the force summing amplifier 7 is of the high gain type so that a more linear relationship is produced between the stick force voltage and the derived voltage from the displacement potentiometer 22. That is, for small voltage increments derived from potentiometer 22, the amplifier 7 has a sufficiently high gain, within limits precluding hunting, so as to overtorque considerably the loading motor 4. This insures a definite pressure reaction at the stick notwithstanding slight movements thereof so that the pilot is always conscious of change in the pressure "feel" of the stick when the position of the stick is slightly changed.

The pilot actuated control and potentiometer arrangement herein illustrated can be embodied in any suitable structural arrangement, such as for example that shown in my Patent No. 2,366,603, granted January 2, 1945 for "Aircraft Training Apparatus."

Referring now to Figs. 2, 3 and 4, there is shown a modified embodiment of the present invention wherein the control loading is primarily in response to stick pressure applied by the pilot and a function of airspeed. In this arrangement, the simulated aircraft control is also represented as a stick 1 pivotally mounted at 2 for fore and aft movement to simulate climb and dive maneuvers. In this case, the stick is provided with an extension 1' that is connected to a flexible cable 40, in turn connected to a pair of springs 41 and 42 arranged to be stressed or relaxed by loading motors 43 and 44 respectively.

The motor 43 is operatively connected to the spring 41 through a gear box 43a, lead screw 43b and an internally threaded sleeve 43c that is suitably guided as indicated for linear non-rotative movement according to rotation of the screw 43b. The sleeve 43c is in turn suitably connected to the spring 41 at the cable and section 41'. The loading motor 44 is similarly connected to the spring 42 through identical means. The cable 40 may be guided on pulleys 45 and 46 so that simultaneous lowering or raising of the sleeves 43c and 44c in response to concurrent operation of the motors 43 and 44 stresses or relaxes the springs for varying the resistance to movement of the stick from its neutral position according to the simulated control loading required.

The control system for the loading motors 43 and 44 includes essentially a pair of strain gages $G_1$ and $G_2$ suitably connected to the cable 40, an example being illustrated by Fig. 3. Each strain gage includes a potentiometer that is controlled according to the tension applied to the cable 40 for deriving a control voltage that is used as hereinafter described for affecting the motor operation. Since the construction of the gages is similar, a description of the gage $G_1$, Fig. 3, will be sufficient. A potentiometer 47 is suitably mounted on a rigid frame 48 that is freely connected as indicated to the cable at spaced points. A plunger 49 bearing on the cable is guided in the frame and is spring biased at 50 in a direction to oppose downward movement of the plunger due to cable tension. The plunger also carries the slider contact 47' of the potentiometer so that the instant position of the slider is a measure of the cable tension. The potentiometer is energized at its lower terminal 47a by an airspeed function voltage $\pm E1/V$ that may be obtained from a computer hereinafter referred to. This voltage varies according to the magnitude of the simulated air speed. The upper terminal 47b of the potentiometer is suitably grounded. Accordingly, the derived voltage $E_{F/V}$ at the slider 47' represents a combined function of air speed and stick force.

Referring now to Fig. 2, the air speed function voltage for energizing the gages $G_1$ and $G_2$ may be obtained for example, from a simulated flight computer such as the one referred to above disclosed in my application Serial No. 429,314. The voltage $E1/V$ so obtained may be used to energize the primary winding 51 of a transformer 52, the secondary winding 53 having a grounded center tap so that the voltages at the secondary terminals are oppositely phased as indicated.

These terminals are connected by conductors 54 and 55 to the gages $G_1$ and $G_2$ respectively so that the potentiometers thereof are energized by the oppositely phased voltages $\pm E1/V$ and $\mp E1/V$, Fig. 4. The derived voltages at the corresponding sliders are in turn connected by conductors 56 and 57 to the input proportioning resistances 58 and 59 of a summing amplifier 60 representing the rate of pitch ($\omega_y$) amplifier of the aforesaid computing system. This amplifier has other inputs from the interconnected servo apparatus of the computing system and the computing system is controlled according to the rate of pitch and other input control voltages from simulated aileron, rudder, and throttle controls as described in my aforesaid application, Serial No. 429,314.

The motor control system is responsive to a voltage $E_V{}^2$ representing air speed squared that is produced by the flight computer according to the various input control quantities. For this purpose, the computer is connected by conductor 61 to a pair of series connected resistances 62 and 63, the common terminal of which is connected by a conductor 64 to a motor control system. The output of this system is dephased 90° with respect to the reference voltage $E_{ac}$ and energizes through the conductor 65 and 66 the control windings of the two-phase motors 43 and 44 respectively, the reference windings of which are energized by voltage $E_{ac}$. The resistance 63 is connected to the adjustable slider 67 of a potentiometer 68 that is energized by an "answer" voltage $\mp E$ oppositely phased with respect to the computer voltage $E_V{}^2$. The slider 67 is mechanically positioned as indicated at 69 according to the operation of the motor 44 so that when the oppositely phased voltages are equal in magnitude the voltage on the motor control conductor 64 is zero. Predominance of either voltage determines the phase of the control voltage. The motor control apparatus can be of any suitable type for sensing the phase of the control voltage and then by relay operation or the like controlling the direction of rotation of the loading motors. An example of such sensing and relay control apparatus is disclosed in my aforesaid application, Serial No. 429,314.

In the interest of simplicity a separate trim adjustment is not illustrated. However, it will be apparent that the stick can be trimmed by merely operating one motor independently of, or in opposition to, the other for varying the neutral position of the stick according to the disclosure of Fig. 2.

The operation of the system of Fig. 2 is now made clear by the foregoing description. For example, when the pilot wishes to simulate a climb maneuver, the stick is rotated counter-clockwise as viewed thereby increasing the tension at gage $G_1$ and decreasing the tension at gage $G_2$. Accordingly, the derived voltage $\pm EF/V$ at gage $G_1$ predominates over the oppositely phased voltage from gage $G_2$ as best illustrated by Fig. 4 thus determining the phase or sense of the resultant stick force voltage that is fed to the rate of pitch amplifier 60. The computer thereupon utilizes the output of amplifier 60 to produce the control voltages $E1/V$ and $E_V{}^2$ above referred to for in turn energizing the gage potentiometers and the motor control system respectively. As the force exerted on the stick by the pilot increases, the derived voltage $E_{FV}$ increases thereby causing the output of amplifier 60 to represent greater positive pitch rate, with consequent reaction on other flight factors represented in the computer thus tending to modify the air speed function voltages $E1/V$ and $E_V{}^2$. As the air speed factor decreases the motor control voltage on conductor 64 becomes negative due to predominance of the answer voltage from potentiometer 68, thus causing the motor control system to operate the motors 43 and 44 in a direction to equalize the voltages and elevate the spring adjusting sleeves 43c and 44c. This relaxes the springs a certain amount. The stick reaction force is thereby decreased and the pilot can relax his pressure on the stick somewhat corresponding to the lower air speed.

It will be noted that in the above-described system the force applied to the stick by the pilot, rather than the stick displacement, is the predominant factor responsible for determining the rate of pitch representation which in turn in combination with other flight factors determines the representation of air speed. Thus, accurate calibration for relating the control pressure, deflection and air speed characteristics of the control loading system is unnecessary as previously explained for obtaining realistic simulation of the stick "feel."

It is to be understood that the invention may be applied in various forms. Changes may be made in the arrangements shown without departing from the spirit or scope of the invention as will be apparent to those skilled in the art and reference should be made to the appended claims for a definition of the limits of the invention.

What is claimed is:

1. Flight simulating apparatus for loading aircraft flight controls operable by a pilot to simulate aerodynamic forces comprising motive power means operatively connected to a respective flight control for varying opposition to the force applied by the pilot tending to move the control from a neutral position, means responsive to small or minute distortion under stress operatively connected to said control for deriving according to the applied force on said control as distinguished from its displacement from neutral a control voltage having a precise and predetermined relation to the applied force on said flight control, and means responsive to said control voltage for primarily controlling the effectiveness of said motive power means so as to vary the reactive force of the flight control.

2. Flight simulating apparatus for loading aircraft flight controls operable by a pilot to simulate aerodynamic forces comprising motive power means operatively connected to a respective flight control for varying opposition to the force applied by the pilot tending to move the control from a neutral position, means responsive to small or minute distortion under stress operatively connected to said control for deriving according to the applied force on said control as distinguished from its displacement from neutral a control voltage having a precise and predetermined relation to the applied force on said flight control, and computing means responsive to said voltage for producing potential for in turn primarily controlling the effectiveness of said motive power means according to said potential so as to vary the reactive force of the flight control.

3. In ground based flight training apparatus having simulated aircraft flight controls operable by a student pilot and flight simulating means for producing control voltages representing functions of simulated airspeed, means for loading said controls to simulate flight conditions comprising motive power means operatively connected to a respective flight control for varying opposition to the force applied by the pilot tending to move the control from a neutral position, force responsive means operatively connected to said control for deriving according to the applied force on said control as distinguished from its displacement from neutral a control voltage having a precise and predetermined relation to the applied force on said flight control, and means whereby said motive power means primarily is controlled jointly according to the value of said derived voltage in combination with a voltage representing a function of simulated airspeed so as to vary the reactive force of the flight control.

4. In ground based flight training apparatus having simulated aircraft flight controls operable by a student pilot and flight simulating means for producing control voltages representing functions of simulated airspeed, means for loading said controls to simulate flight conditions comprising motive power means operatively connected to a respective flight control for varying opposition to the force applied by the pilot tending to move the control from a neutral position, strain responsive means operatively connected to said control for deriving according to the strain on said control as distinguished from its displacement from neutral a control voltage having a precise and predetermined relation to the applied force on said flight control, and means whereby said motive power means is controlled primarily according to the value of said derived voltage, said motive power means also being controlled according to airspeed by an aforesaid function voltage for changing the relation between the force applied to the control and the control displacement.

5. In ground based flight training apparatus having simulated aircraft flight controls operable by a student pilot and flight simulating means for producing control voltages representing functions of simulated airspeed, means for loading said controls to simulate flight conditions comprising electric motive power means operatively connected to a respective flight control for varying opposition to the force applied by the pilot tending to move the control from a neutral position, strain responsive means operatively connected to said control for deriving according to the strain on said control as distinguished from its displacement a control voltage having a precise and predetermined relation to the applied force on said flight control, and means whereby said motive power means is controlled according to the value of the resultant of said applied force voltage, an airspeed function voltage and the degree of displacement so as to vary the reactive force of the flight control.

6. In ground based flight training apparatus having simulated aircraft controls operable by a student pilot and flight computing means for producing control voltages including a voltage representing a function of airspeed responsive to the operation of said aircraft controls, means for loading said controls to simulate flight conditions comprising a source of alternating current voltage, an electric torque motor energized from said source and operatively connected to a respective control for opposing to a variable degree the force applied by the pilot tending to move the control from its neutral position, strain responsive resistance means connected to said control, phase sensing means connected to said source and said resistance means, means responsive to said sensing mean for energizing said torque motor according to the magnitude and sense of said control force, and means energized according to said airspeed control voltage and operable by said control for also energizing said torque motor.

7. In ground based flight training apparatus having a simulated aircraft control operable by a student pilot and means for producing control voltages including voltages representing functions of airspeed, means for loading said control to simulate flight conditions comprising motive power means associated with said control for varying opposition to the force applied by the pilot tending to move the control from its neutral position, means jointly responsive to said force and to one of said airspeed voltages for deriving control voltages, said producing means being responsive to said control voltages, and means for energizing said motive power means according to another of said airspeed function voltages.

8. In ground based flight training apparatus having a simulated aircraft control operable by a student pilot and flight computing means for producing control voltages including voltages representing functions of airspeed responsive to the operation of said aircraft control, means for loading said control to simulate flight conditions comprising spring means and motive power means operatively connected to said control, said motive power means being arranged to vary the effectiveness of said spring means for opposing to a variable degree the force applied by the pilot tending to move the control from its neutral position, strain responsive resistance means energized by one of said function voltages and associated with said control for deriving control potential according to pilot pressure tending to move said control from its neutral position, said computing means being responsive to said control potential, and means for energizing said motive power means in accordance with another function voltage produced by said computing means.

9. In ground based flight training apparatus having simulated aircraft flight controls operable by a student pilot and flight computing means for producing control voltages including voltages representing functions of simulated airspeed, said computing means including means for computing a function of the attitude of the aircraft as affected by a respective control, means for loading the respective control to simulate flight conditions comprising motive means operatively connected to said control for varying opposition to the force applied by the pilot tending to move the control from a neutral position, force responsive means operatively connected to said control for deriving in conjunction with an airspeed function voltage control potential according to the applied force on said control as distinguished from its displacement from neutral, said potential having a precise and predetermined relation to the applied force on said flight control for a given value of airspeed, said attitude function computing means being controlled by said control potential, and means for controlling said motive means also in accordance with an airspeed function voltage from the flight computing means.

10. In ground based flight training apparatus having simulated aircraft flight controls including an elevator control operable by a student pilot and flight computing means for producing control voltages including voltages representing functions of simulated airspeed, said computing means including means for computing rate of pitch, means for loading said elevator control to simulate flight conditions comprising motive means operatively connected to said control for varying opposition to the force applied by the pilot tending to move the control from a neutral position, force responsive means operatively connected to said control and energized according to an airspeed function voltage for deriving according to the applied force on said control, as distinguished from its displacement from neutral, control potential having a precise relation to the applied force on said flight control, said rate of pitch computing means being controlled by said control potential, and means for controlling said motive means also in accordance with an airspeed function voltage from the flight computing means.

11. In ground based flight training apparatus having simulated aircraft flight controls operable by a student pilot and flight computing means for producing control voltages including voltages representing functions of simulated airspeed, said computing means including means for computing a function of the attitude of the aircraft as affected by a respective control, means for loading the respective control to simulate flight conditions comprising motive means operatively connected through resilient structure to said control for varying opposition to the force applied by the pilot tending to move the control from a neutral position, force responsive means operatively connected to said control and to said flight computing means for deriving according to the applied force on said control, as distinguished from its displacement from neutral, control potential having a precise and predetermined relation to the applied force on said flight control for a given value of airspeed, said attitude function computing means being controlled by said control potential, and means for controlling said motive means in accordance with an airspeed function voltage from the flight computing means.

12. In ground-based flight training apparatus having simulated aircraft controls operable by a student pilot and flight computing means for producing control potential, including potential representing a function of airspeed, responsive to the operation of said aircraft controls, means for loading said controls to simulate aerodynamic loading of aircraft control surfaces comprising an electric motor having a rotor mechanically connected through a non-yielding connection to a respective control for applying the motor torque thereto and opposing to a variable degree the force applied by the pilot tending to move the control from a neutral position during simulated maneuvers, strain responsive means connected to said control so as to be affected by strain on the control as distinguished from its displacement for deriving potential representing applied control pressure, means for deriving a second control potential jointly according to the magnitude of said airspeed control potential and the displacement of said control, and means for jointly energizing said electric motor for producing said torque according to the magnitude and sense of the resultant of said applied pressure potential and said second control potential.

13. In ground-based flight training apparatus having simulated aircraft controls operable by a student pilot and flight computing means for producing control voltages, including a voltage representing a function of airspeed, responsive to the operation of said aircraft controls, means for loading said controls to simulate aerodynamic loading of aircraft control surfaces comprising an electric motor connected to a respective control for opposing to a variable degree the force applied by the pilot tending to move the control from a neutral position, a pair of strain gages connected to said control so as to be responsive to said force for deriving a pair of voltages respectively, each gage being separately connected to said control so as to be affected by strain (as distinguished from control displacement) in opposite sense as the control is moved from neutral in opposite directions respectively by the pilot, means for combining said strain voltages to represent the magnitude and sense of pilot-applied control pressure with respect to neutral, means for modifying said airspeed voltage according to control displacement and means for jointly energizing said electric motor according to the magnitude and sense of the resultant of said modified airspeed and control pressure voltages.

References Cited in the file of this patent

UNITED STATES PATENTS

| | | |
|---|---|---|
| 2,510,174 | Heller | June 6, 1950 |
| 2,519,233 | Davis et al. | Aug. 15, 1950 |
| 2,695,145 | Lear et al. | Nov. 23, 1954 |